(12) United States Patent
Chang et al.

(10) Patent No.: US 12,738,752 B2
(45) Date of Patent: Sep. 15, 2026

(54) PROTECTION CIRCUIT FOR BATTERY MODULE

(71) Applicant: STL TECHNOLOGY CO., LTD., Kaohsiung City (TW)

(72) Inventors: Wen-Fan Chang, Kaohsiung City (TW); Chun-Chieh Li, Kaohsiung City (TW); Jung-Nan Chien, Kaohsiung City (TW)

(73) Assignee: STL TECHNOLOGY CO., LTD., Kaohsiung City (TW)

( * ) Notice: Subject to any disclaimer, the term of this patent is extended or adjusted under 35 U.S.C. 154(b) by 662 days.

(21) Appl. No.: 18/220,250

(22) Filed: Jul. 10, 2023

(65) Prior Publication Data

US 2024/0079887 A1 Mar. 7, 2024

(30) Foreign Application Priority Data

Sep. 5, 2022 (TW) ................................ 111133614

(51) Int. Cl.

| | |
|---|---|
| ***H02J 7/00*** | (2026.01) |
| ***H02J 7/60*** | (2026.01) |
| ***H02J 7/61*** | (2026.01) |
| ***H02J 7/63*** | (2026.01) |

(52) U.S. Cl.
CPC .................................... *H02J 7/61* (2026.01); *H02J 7/63* (2026.01); *H02J 7/663* (2026.01)

(58) Field of Classification Search
None
See application file for complete search history.

(56) References Cited

U.S. PATENT DOCUMENTS

2011/0273137 A1* 11/2011 Nakatsuji .............. H01M 10/42 361/86

* cited by examiner

*Primary Examiner* — Arun C Williams
(74) *Attorney, Agent, or Firm* — HDLS IPR SERVICES; Chun-Ming Shih

(57) ABSTRACT

The present invention provides a protection circuit applied to a battery module, which includes a self-control protector, a switch element and a voltage clamping loop; the self-control protector includes a fuse unit and a heater; when the switch element receives a control signal, the switch element will be turned on; when the switch element is turned on, the voltage clamping loop provides a clamp voltage to clamp a working current passing through the self-control protector within a current range where the fuse unit can be blown; and as such, the fuse unit of the self-control protector will be blown by the working current heating the heater.

9 Claims, 2 Drawing Sheets

PROTECTION CIRCUIT FOR BATTERY MODULE

This non-provisional application claims priority claim under 35 U.S.C. § 119(a) on Taiwan Patent Application No. 111133614 filed Sep. 5, 2022, the entire contents of which are incorporated herein by reference.

FIELD OF THE INVENTION

The invention relates to a protection circuit applied to a battery module, in particular to a protection circuit capable of blowing a fuse of a self-control protector when a voltage of a battery module is in a high-voltage state or a low-voltage state.

BACKGROUND

In today's battery management system, along a charging path, in addition to overcharge protection through a MOSFET switch element, a self-control protector (SCP) with a fuse is also used for overcharge protection.

Moreover, in the past, the self-control protector was only designed for overcharge (also known as overvoltage) protection, and blowing of the fuse of the self-control protector was in conjunction with the actuation of an overcharge protection IC. Since the self-control protector is usually used only for overcharge protection, an operating voltage range where the fuse of the self-control protector can be blown usually falls outside a voltage of the battery module at a low capacity. Therefore, if the voltage of the battery module is in a low-voltage state and the self-control protector is adopted as protection against other abnormalities (e.g., overdischarge), since power carried by a heater of the self-control protector is insufficient due to the fact that, for example, when the voltage of the battery module is too low, a current flowing through impedance of the heater will become small, and the power ($P=I^2R$) becomes small, causing insufficient power carried by the heater and resulting in insufficient heat generation, so that the fuse to take excessively long time to be blown and have a problem of being unable to be blown.

In view of this, the invention presents an innovative protection circuit applied to a battery module, when the voltage of the battery module is in a low-voltage state, if the battery module is abnormal (e.g., overheat, overcharge or overdischarge), the protection circuit can still blow the fuse of the self-control protector smoothly so as to protect the battery module, which will be the objective of the invention.

SUMMARY

An objective of the invention is to provide a protection circuit applied to a battery module. The protection circuit includes a self-control protector, a switch element and a voltage clamping loop. The self-control protector comprises a fuse unit and a heater. When the battery module operates in an abnormal state, such as overcharge, overdischarge or overheat, the switch element will receive a control signal and therefore be turned on. When the switch element is turned on, the voltage clamping loop provides a clamp voltage to clamp a working current passing through the heater on the self-control protector within a current range where the fuse unit can be blown or clamp a working voltage applied across the heater of the self-control protector within a voltage range where the fuse unit can be blown. As such, regardless of whether a total voltage of the battery module is in a high-voltage state or a low-voltage state, the voltage clamping loop can clamp the working current or working voltage, which is applied on the heater of the self-control protector, within the current range or voltage range where the fuse unit can be blown, such that when the battery module is in an abnormal state of overcharge, overdischarge or overheat, the fuse unit can be smoothly blown within a limited time.

In order to achieve the above objective, the invention provides a protection circuit applied to a battery module, the battery module comprising a plurality of battery cells strung together, the protection circuit comprising: a self-control protector, including a fuse unit and a heater, wherein the fuse unit is connected to a power positive terminal of the battery module, and the heater is provided with one end connected to the fuse unit; a switch element, when the switch element receives a control signal, the switch element will be turned on; and a voltage clamping loop, connected to the battery module, the self-control protector and the switch element; wherein the voltage clamping loop forms a clamp voltage when the switch element is turned on, the clamp voltage clamps a working current passing through the self-control protector within a current range where the fuse unit is blown, such that the fuse unit of the self-control protector is blown by the working current heating the heater.

In an embodiment of the invention, the voltage clamping loop includes a first voltage dividing element, having one end connected to the power positive terminal of the battery module, and having the other end connected to a first node; a second voltage dividing element, having one end connected to the first node, and having the other end connected to a power negative electrode of the battery module via the switch element; a voltage clamping element, connected with the first voltage dividing element in parallel; and a power transistor, including a first terminal, a second terminal and a control terminal, wherein the first terminal of the power transistor is connected to the power negative electrode of the battery module, the second terminal of the power transistor is connected to the other end of the heater, and the control terminal of the power transistor is connected to the first node; wherein when the switch element is turned on, the voltage clamping loop forms the clamp voltage between the power positive electrode of the battery module and the control terminal of the power transistor.

In an embodiment of the invention, the self-control protector specifies an operating voltage range where the fuse unit is blown, the voltage clamping loop forms a working voltage on the heater, the working voltage is a voltage difference between the clamp voltage and a turn-on voltage of the power transistor, and the working voltage is clamped within the operating voltage range where the fuse unit is blown by the voltage clamping element.

In an embodiment of the invention, the first voltage dividing element and the second voltage dividing element are resistors, and a resistance value of the first voltage dividing element is greater than a resistance value of the second voltage dividing element.

In an embodiment of the invention, the voltage clamping element is a Zener diode, and the power transistor is a P-channel metal-oxide-semiconductor field effect transistor or a P-channel junction field-effect transistor.

In an embodiment of the invention, the first terminal of the power transistor is connected to the power negative electrode of the battery module via a power resistor.

In an embodiment of the invention, a string number of the battery cells of the battery module are M, and the self-control protector is a self-control protector applicable to a string number specification of N strings of battery cells, and N is less than M.

In an embodiment of the invention, the switch element is connected to an overcharge protection chip, and when the overcharge protection chip detects that the battery module is in an overcharge state, the overcharge protection chip outputs the control signal to the switch element.

In an embodiment of the invention, the protection circuit further includes an operating parameter sampling chip and a microprocessor connected to the switch element and the operating parameter sampling chip, wherein the microprocessor samples at least one operating parameter of the battery module or along a charge and discharge path via the operating parameter sampling chip, determines whether the battery module operates in an abnormal state by analyzing the operating parameter, and transmits the control signal to the switch element when the battery module operates in the abnormal state.

In an embodiment of the invention, the operating parameter sampling chip is a chip used for sampling a current parameter, a voltage parameter or a temperature parameter.

DETAILED DESCRIPTION OF THE PREFERRED EMBODIMENTS

Figure 1:
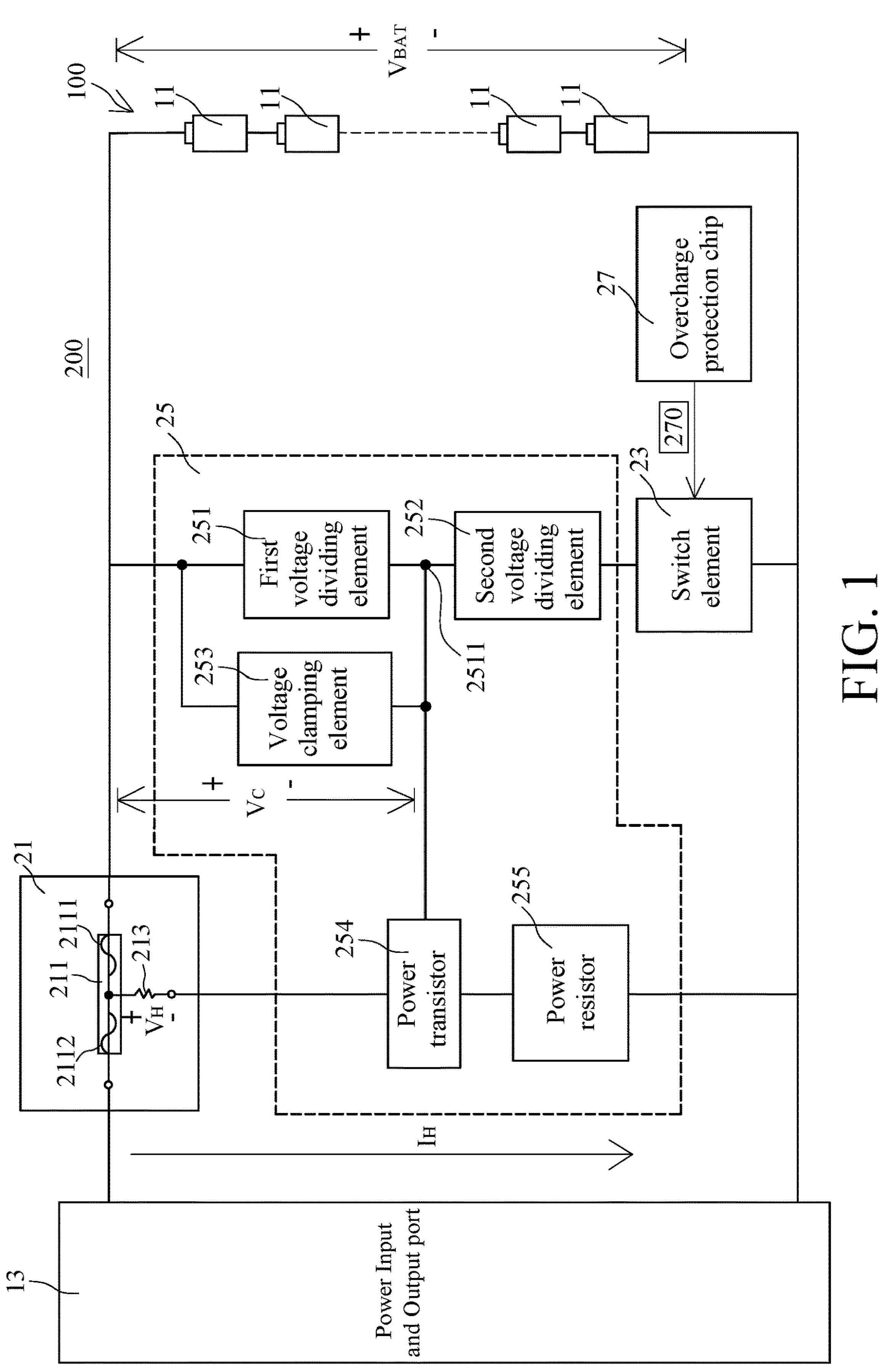
FIG. 1 is a circuit block diagram of a protection circuit according to an embodiment of the present invention.

Referring to FIG. 1, it is a circuit block diagram of a protection circuit according to an embodiment of the present invention. As shown in FIG. 1, a protection circuit 200 of the present invention is applied to a battery module 100, and used to protect the safety of the battery module 100 during operating. The battery module 100 includes a plurality of battery cells 11 strung together, and a total voltage of which is $V_{BAT}$. In an embodiment of the invention, a stringing number of the battery cells 11 are M.

The protection circuit 200 includes a self-control protector 21, a switch element 23 and a voltage clamping loop 25. The self-control protector 21 includes a fuse unit 211 and a heater 213. The fuse unit 211 includes a first fuse 2111 and a second fuse 2112. One end of the first fuse 2111 is connected to a power positive terminal of the battery module 100. One end of the second fuse 2112 is connected with the other end of the first fuse 2111, and the other end of the second fuse 2112 is connected to a power input and output port 13 of the battery module 100. One end of the heater 213 is connected to a connection point between the first fuse 2111 and the second fuse 2112.

The switch element 23 can also be a transistor switch, which is configured between the voltage clamping loop 25 and a power negative terminal of the battery module 100. When the switch element 23 receives a control signal 270, the switch element 23 will be turned on.

The voltage clamping loop 25 is connected to the battery module 100, the self-control protector 21 and the switch element 23. When the switch element 23 is turned on, the voltage clamping loop 25 provides a clamp voltage $V_C$. Furthermore, when the switch element 23 is turned on, a working current hi will pass through the self-control protector 21, the clamp voltage $V_C$ provided by the voltage clamping loop 25 will clamp the working current hi within a current range where the fuse unit 211 can be blown.

Further, the voltage clamping loop 25 includes a first voltage dividing element 251, a second voltage dividing element 252, a voltage clamping element 253 and a power transistor 254. The first voltage dividing element 251 is provided with one end connected to the power positive terminal of the battery module 100, and provided with the other end connected to a first node 2511. The second voltage dividing element 252 is provided with one end connected to the first node 2511, and provided with the other end connected to the power negative electrode of the battery module 100 via the switch element 23. The voltage clamping element 253 can also be a Zener diode, which is connected with the first voltage dividing element 251 in parallel. The power transistor 254 is provided with a first terminal connected to the power negative electrode of the battery module 100, provided with a second terminal connected to the other end of the heater 213, and provided with a control terminal connected to the first node 2511. In the present invention, the power transistor 254 is a P-channel metal-oxide-semiconductor field effect transistor (P-MOSFET) or a P-channel junction field-effect transistor (JFET). The first terminal of the power transistor 254 is a drain terminal, the second terminal of the power transistor 254 is a source terminal, and the control terminal of the power transistor 254 is a gate terminal.

The first voltage dividing element 251 and the second voltage dividing element 252 are resistors. A resistance value of the first voltage dividing element 251 will be greater than a resistance value of the second voltage dividing element 252. When the switch element 23 is turned on, the total voltage $V_{BAT}$ of the battery module 100 will be divided into a first voltage $V_1$ and a second voltage $V_2$ on the first voltage dividing element 251 and the second voltage dividing element 252, respectively, where $V_1$ is greater than $V_2$.

Through the constant voltage characteristic of the voltage clamping element 253, the first voltage $V_1$ applied to the self-control protector 21 and the power transistor 254 will be clamped into a fixed clamp voltage $V_C$, and the clamp voltage $V_C$ will be formed between the power positive electrode of the battery module 100 and the control terminal of the power transistor 254. Moreover, the self-control protector 21 specifies an operating voltage range where the fuse unit 211 can be blown. The voltage clamping loop 25 forms a working voltage $V_H$ on the heater 213. The working voltage $V_H$ is a voltage difference between the clamp voltage $V_C$ and a turn-on voltage ($V_{SG}$) of the power transistor 254. By the voltage clamping element 253, the working voltage $V_H$ will be clamped within the operating voltage range where the fuse unit 211 can be blown. Thus, when the switch element 23 is turned on, the working voltage $V_H$ will be applied across the heater 213 to make the working current hi capable of blowing the fuse unit 211 pass through impedance of the heater 213.

Thus, through the voltage clamping function of the voltage clamping loop 25, the working voltage $V_H$ applied across the heater 213 of the self-control protector 21 is clamped within the operating voltage range where the fuse unit 211 can be blown, so that the working current hi capable of blowing the fuse unit 211 can flow through the heater 213 to smoothly heat the heater 213 to a sufficient temperature, and therefore blow the fuse unit 211 within a limited time.

In an embodiment of the present invention, a high-power transistor can be selected as the power transistor 254. A voltage difference ($V_{BAT}-V_H$) between the total voltage $V_{BAT}$ of the battery module 100 and the working voltage $V_H$ of the self-control protector 21 will be applied across the power transistor 254, and an energy generated by the voltage difference ($V_{BAT}-V_H$) will be borne by the power transistor 254.

Alternatively, in another embodiment of the present invention, the first terminal of the power transistor 254 is connected to the power negative electrode of the battery module 100 via a power resistor 255. The voltage difference ($V_{BAT}-V_H$) between the total voltage $V_{BAT}$ of the battery module 100 and the self-control protector 21 will be applied across the power transistor 254 and the working voltage $V_H$ of the power resistor 255. In this way, the power resistor 255 can share part of the energy of the voltage difference ($V_{BAT}-V_H$) between the total voltage $V_{BAT}$ of the battery module 100 and the working voltage $V_H$ of the self-control protector 21 so as to avoid the power transistor 254 from bearing all the energy of the voltage difference ($V_{BAT}-V_H$) between the total voltage $V_{BAT}$ of the battery module 100 and the working voltage $V_H$ of the self-control protector 21 alone and being burned out.

Then, various commercially available models of self-control protectors (SCPs) 21 are designed with different specifications, respectively. For example, a self-control protector of model A is designed to be applicable to 6 to 9 strings of battery cells and has an operating voltage range of 20.2 to 46.3 V; a self-control protector of model B is designed to be applicable to 10 to 14 strings of battery cells and has an operating voltage range of 28.0 to 62.0 V; or a self-control protector of model C is designed to be applicable to 15 to 17 strings of battery cells and has an operating voltage range of 39.6 to 72.0 V. Therefore, when a self-control protector 21 with a high string number specification of battery cells is selected, an operable voltage range of a fuse unit 211 thereof will be relatively high; and in contrast, when a self-control protector 21 with a low string number specification of battery cells is selected, an operable voltage range of a fuse unit 211 thereof will be relatively low.

In the invention, the protection circuit 200 will select a self-control protector 21 with a string number specification of battery cells lower than an actual string number of the battery cells 11 to protect the battery module 100. For example, the string number of the battery cells 11 of the battery module 100 can be M, and the protection circuit 200 selects a self-control protector 21 with a string number specification of N strings of battery cells, where N is less than M. Thus, a self-control protector 21 with a low string number specification of battery cells will be applied to a battery module 100 with a relatively great string number of battery cells 11, such that the battery modules 100 with different relatively great string numbers of battery cells 11 can be protected by using the same self-control protector 21 with a low string number specification of battery cells. For example, the battery modules 100 having 10 or more battery cells 11 can be protected by using self-control protectors 21 with string number specifications of 6 to 9 strings of battery cells.

To sum up, regardless of whether the total voltage $V_{BAT}$ of the battery module 100 is in a high-voltage state or a low-voltage state, the voltage clamping loop 25 of the protection circuit 200 can clamp the working voltage $V_H$ on the heater 213 of the self-control protector 21 within the operating voltage range where the fuse unit 211 can be blown, such that when the battery module 100 is in an overcharge, overdischarge or overheat state, the fuse unit 211 can be smoothly blown within a limited time. Moreover, the voltage difference ($V_{BAT}-V_H$) between the total voltage $V_{BAT}$ of the battery module 100 and the working voltage $V_H$ of the self-control protector 21 is borne by the power transistor 254 and/or the power resistor 255, in such a way that an action of blowing the fuse unit 211 of the self-control protector 21 will not be affected.

Further, the protection circuit 200 further includes an overcharge protection chip 27 connected to the switch element 23. The overcharge protection chip 27 is connected to the battery module 100 to detect whether the battery module 100 is in an overcharge (also known as overvoltage) state. When the overcharge protection chip 27 detects that the battery module 100 is in the overcharge state, the overcharge protection chip 27 will transmit a control signal 270 to the switch element 23 to control the switch element 23 to be turned on. After the switch element 23 is turned on, the voltage clamping loop 25 will provide the clamp voltage $V_C$ to clamp the working current hi or the working voltage $V_H$ of the self-control protector 21 within the current range or the voltage range where the fuse unit 211 can be blown, so as to enable the fuse unit 211 of the self-control protector 21 to be smoothly blown, thereby avoiding the battery module 100 from being continuously charged and discharged through the power input and output port 13 when the battery module 100 is in the abnormal state.

Figure 2:
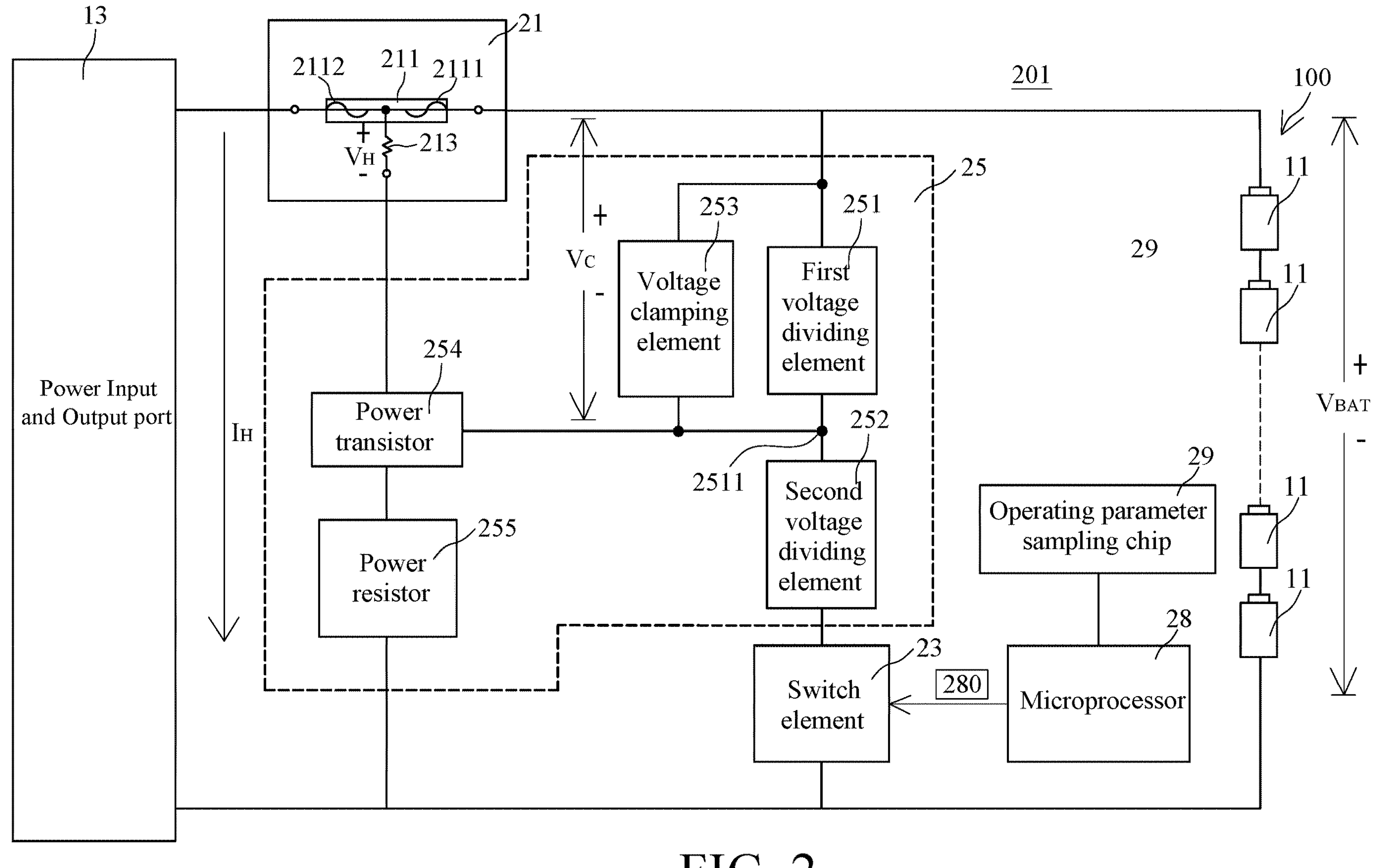
FIG. 2 is a circuit block diagram of a protection circuit according to another embodiment of the present invention.

Referring to FIG. 2, it is a circuit block diagram of a protection circuit according to another embodiment of the present invention. As shown in FIG. 2, the protection circuit 201 of the present embodiment further includes a microprocessor 28 and an operating parameter sampling chip 29. The switch element 23 is connected to the microprocessor 28, and the microprocessor 28 is connected to the operating parameter sampling chip 29 via a connecting circuit (e.g., a connecting circuit conforming to of an RS232 specification, a $U_{ART}$ specification or an $I_{2C}$ specification). The operating parameter sampling chip 29 is an analog front end (AFE) chip, which is connected to the battery module 100 or a charge and discharge path to sample a current parameter, a voltage parameter or a temperature parameter of the battery module 100 or along the charge and discharge path.

The microprocessor 28 samples at least one operating parameter of the battery module 100 or along the charge and discharge path via the operating parameter sampling chip 29, such as sampling a current along the charge and discharge path, sampling a voltage of the battery module 100 or sampling a temperature of the battery module 100, determines whether the battery module 100 abnormally operates, such as whether the battery module 100 is overcharged, overdischarged or overheated, by analyzing the operating parameter, and transmits a control signal 280 to the switch element 23 when the battery module 100 abnormally operates to control the switch element 23 to be turned on. After the switch element 23 is turned on, the voltage clamping loop 25 will provide the clamp voltage $V_C$ to clamp the working current hi or the working voltage $V_H$ of the self-control protector 21 within the current range or voltage range where the fuse unit 211 can be blown, so as to enable the fuse unit 211 of the self-control protector 21 to be smoothly blown, thereby avoiding the battery module 100 from being continuously charged and discharged through the power input and output port 13 when the battery module 100 is in the abnormal state.

The above mentioned is only an embodiment of the invention and is not intended to limit the scope of the implementations of the invention, i.e., all equivalent variations and modifications of the shapes, structures, features and spirits described within the scope of the claims of the invention shall be included within the scope of the claims of the invention.

The invention claimed is:

1. A protection circuit applied to a battery module, the battery module comprising a plurality of battery cells strung together, the protection circuit comprising:

a self-control protector, comprising a fuse unit and a heater, wherein the fuse unit is connected to a power positive terminal of the battery module, and the heater is provided with one end connected to the fuse unit;

a switch element, when the switch element receives a control signal, the switch element will be turned on; and a voltage clamping loop, connected to the battery module, the self-control protector, and the switch element, wherein the voltage clamping loop comprises:

a first voltage dividing element, provided with one end connected to the power positive terminal of the battery module, and provided with other end connected to a first node;

a second voltage dividing element, provided with one end connected to the first node, and provided with other end connected to a power negative electrode of the battery module via the switch element;

a voltage clamping element, connected with the first voltage dividing element in parallel; and a power transistor, comprising a first terminal, a second terminal and a control terminal, wherein the first terminal of the power transistor is connected to the power negative electrode of the battery module, the second terminal of the power transistor is connected to other end of the heater, and the control terminal of the power transistor is connected to the first node;

wherein the voltage clamping loop forms a clamp voltage when the switch element is turned on, the clamp voltage clamps a working current passing through the self-control protector within a current range where the fuse unit is blown, such that the fuse unit of the self-control protector is blown by the working current heating the heater;

wherein when the switch element is turned on, the voltage clamping loop forms the clamp voltage between the power positive electrode of the battery module and the control terminal of the power transistor.

2. The protection circuit according to claim 1, wherein the self-control protector specifies an operating voltage range where the fuse unit is blown, the voltage clamping loop forms a working voltage on the heater, the working voltage is a voltage difference between the clamp voltage and a turn-on voltage of the power transistor, and the working voltage is clamped within the operating voltage range where the fuse unit is blown by the voltage clamping element.

3. The protection circuit according to claim 1, wherein the first voltage dividing element and the second voltage dividing element are resistors, and a resistance value of the first voltage dividing element is greater than a resistance value of the second voltage dividing element.

4. The protection circuit according to claim 1, wherein the voltage clamping element is a Zener diode, and the power transistor is a P-channel metal-oxide-semiconductor field effect transistor or a P-channel junction field-effect transistor.

5. The protection circuit according to claim 1, wherein the first terminal of the power transistor is connected to the power negative electrode of the battery module via a power resistor.

6. The protection circuit according to claim 1, wherein a string number of the battery cells of the battery module are M, and the self-control protector is a self-control protector applicable to a string number specification of N strings of battery cells, and N is less than M.

7. The protection circuit according to claim 1, wherein the switch element is connected to an overcharge protection chip, and when the overcharge protection chip detects that the battery module is in an overcharge state, the overcharge protection chip outputs the control signal to the switch element.

8. The protection circuit according to claim 1, further comprising an operating parameter sampling chip and a microprocessor connected to the switch element and the operating parameter sampling chip, wherein the microprocessor samples at least one operating parameter of the battery module or along a charge and discharge path via the operating parameter sampling chip, determines whether the battery module operates in an abnormal state by analyzing the operating parameter, and transmits the control signal to the switch element when the battery module operates in the abnormal state.

9. The protection circuit according to claim 8, wherein the operating parameter sampling chip is a chip used for sampling a current parameter, a voltage parameter or a temperature parameter.

* * * * *